United States Patent [19]
Doyle

[11] Patent Number: 5,818,996
[45] Date of Patent: Oct. 6, 1998

[54] FIBER-OPTIC COUPLED DIFFUSE REFLECTANCE PROBE

[75] Inventor: Walter M. Doyle, Laguna Beach, Calif.

[73] Assignee: Axiom Analytical, Inc., Irvine, Calif.

[21] Appl. No.: 784,823

[22] Filed: Jan. 17, 1997

Related U.S. Application Data

[60] Provisional application No. 60/010,171 Jan. 18, 1996.
[51] Int. Cl.⁶ ........................................................ G02B 6/04
[52] U.S. Cl. .............................. 385/115; 385/12; 385/31; 385/33; 385/119
[58] Field of Search ................................. 385/12, 31, 33, 385/115, 116, 119, 139

[56] References Cited

U.S. PATENT DOCUMENTS

| | | | |
|---|---|---|---|
| 3,589,795 | 6/1971 | Miyazaki | 385/119 X |
| 4,529,267 | 7/1985 | Nishioka et al. | 385/119 X |
| 4,618,884 | 10/1986 | Nagasaki | 385/119 X |
| 4,776,667 | 10/1988 | Yoshida et al. | 385/119 X |
| 4,820,015 | 4/1989 | Mogi | 385/115 X |
| 4,844,576 | 7/1989 | Lebeau | 385/119 X |
| 5,351,322 | 9/1994 | VonBargen | 385/12 |

*Primary Examiner*—Brian Healy
*Attorney, Agent, or Firm*—Joseph C. Andras

[57] ABSTRACT

The invention relates to a fiber-optic coupled diffuse reflectance probe that is adapted to detachably connect to a bifurcated fiber bundle. The probe includes one or more lenses for imaging the bundle onto a target with more space between the bundle and the target than otherwise possible. The collecting lens adjacent to the bundle preferably has a reflection stop which diverts reflected light away from the bundle to minimize the problem of stray light. The preferred probe also uses an objective lens to increase the distance between the bundle and the target. The rays emerging from the collecting lens will diverge or spread because of the finite diameter of the transmitting fibers in the bundle. Accordingly, the preferred probe also has a lightguide between the collecting lens and the objective lens to remedy such divergence and, just as significantly, to uniquely spread the various rays from a particular transmitting fiber so that they form a first ring on the target, the several points of the first ring being reimaged onto the fiber bundle as a second ring that covers a plurality of receiving fibers rather than only the original transmitting fiber. The radius of the second ring corresponds to the distance between the original transmitting fiber and the system axis so that the image will be spread about the ring but the system still remains in effective focus. The preferred probe is contained in an elongated housing with a protective window at a far end of the housing. The preferred probe further includes a spacer which varies the position of the protective window relative to the objective lens so that the beam may be selectively focused at the window for contact analysis or beyond the protective window for spaced analysis.

36 Claims, 6 Drawing Sheets

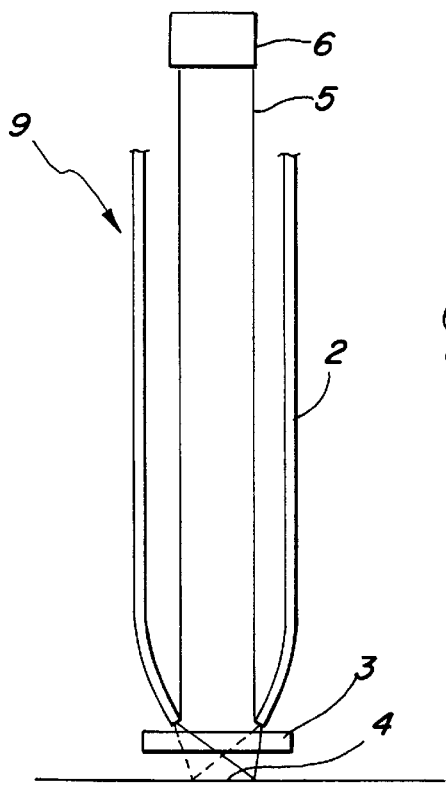
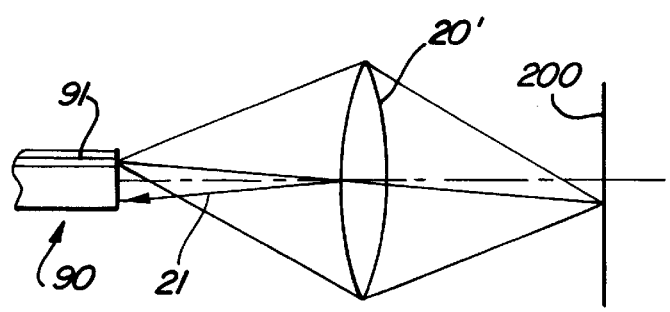
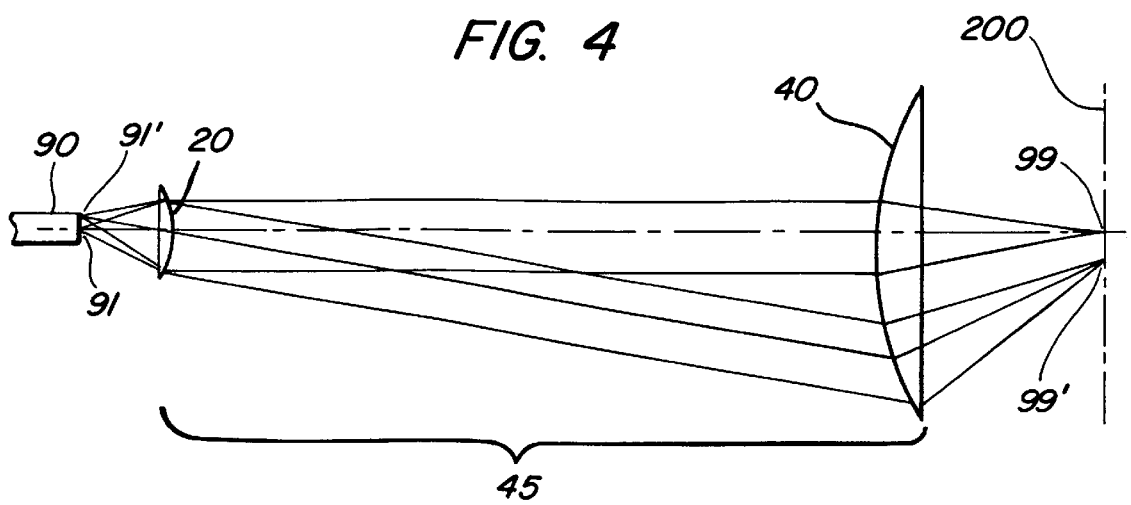

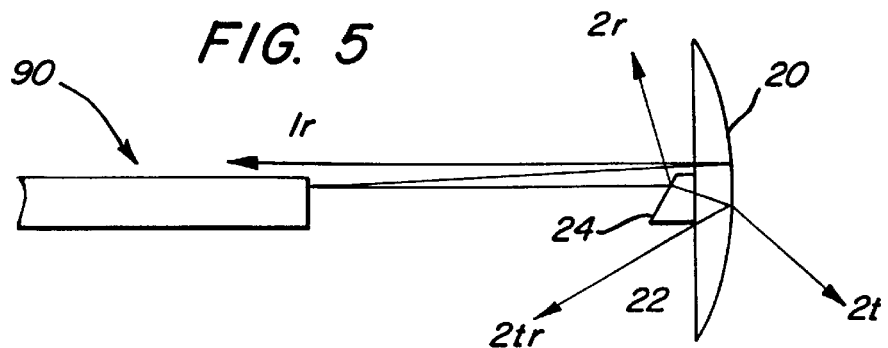
FIG. 5
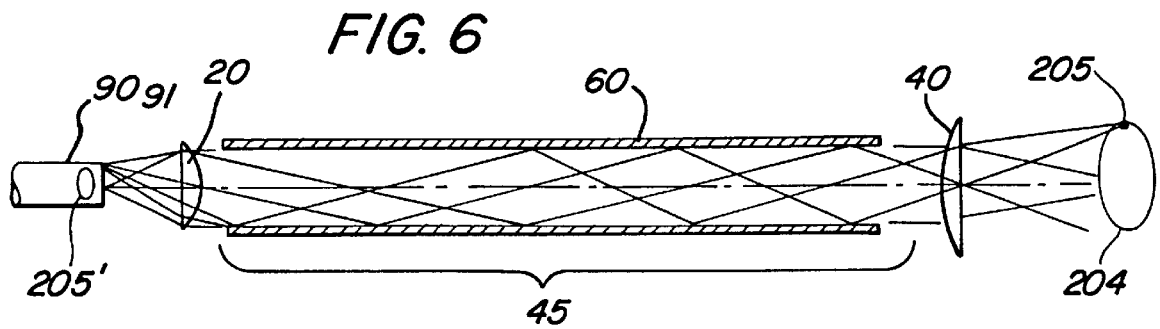
FIG. 6
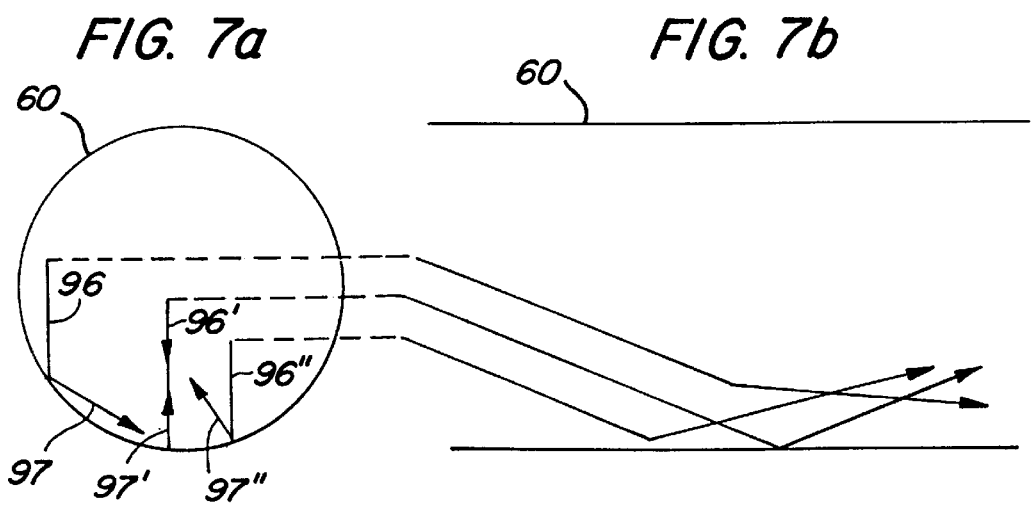
FIG. 7a
FIG. 7b

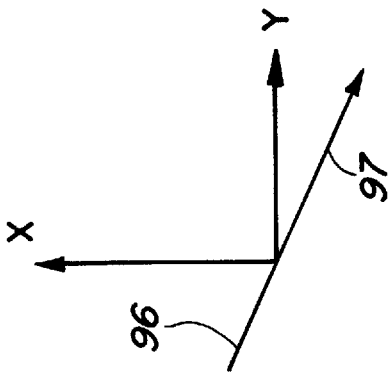
FIG. 8c
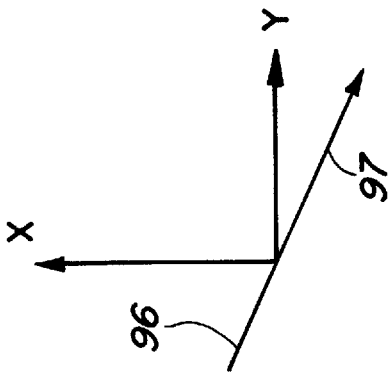
FIG. 8b
FIG. 8a
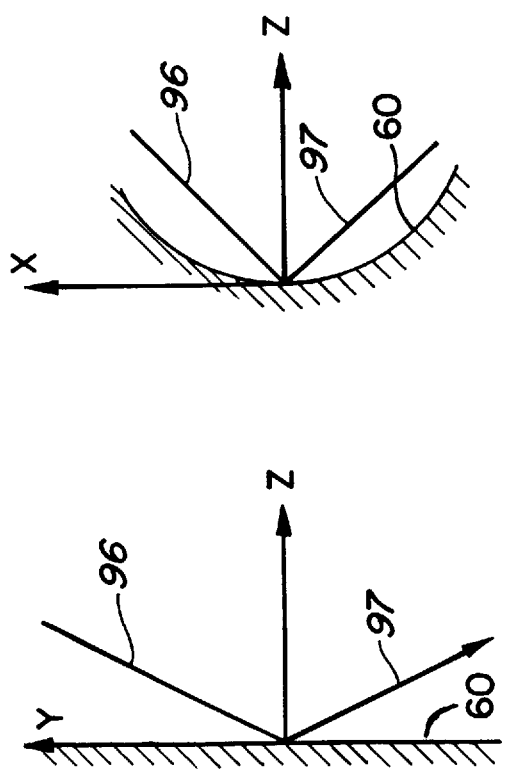
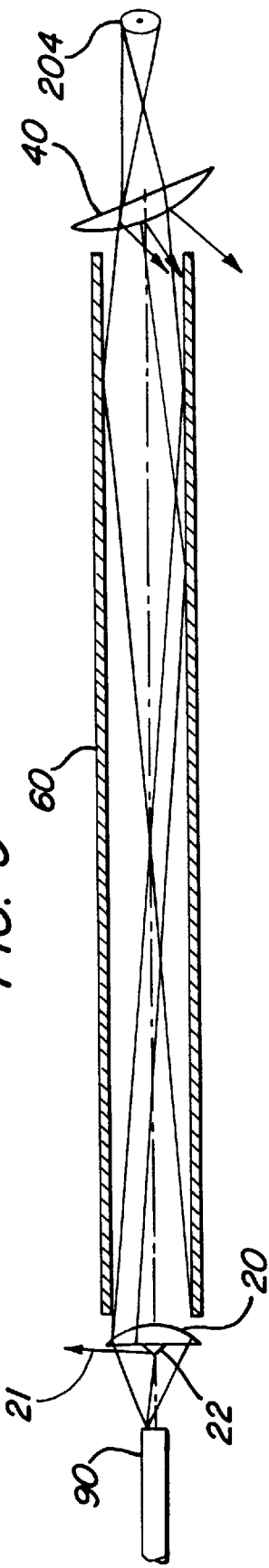
FIG. 9

FIBER-OPTIC COUPLED DIFFUSE REFLECTANCE PROBE

This application claims the benefit of U.S. Provisional application No. 60/010,171, filed Jan. 18, 1996, pending.

BACKGROUND OF THE INVENTION

1. Field of the Present Invention.

The present invention relates generally to diffuse reflectance spectrometry and, more particularly, to an improved spectroscopic sampling device of the type that uses a fiber-optic bundle for transmitting radiation to and then gathering radiation reflected from a diffusely reflecting substance.

2. Description of the Related Art.

Diffuse reflectance spectroscopy ("DRS") has been used for many years to analyze a wide variety of materials. The sample interfacing techniques used have fallen into three broad categories depending on whether the optical spectrum used is in the visible region, the mid infrared region, or the near infrared region.

In the visible region of the spectrum, DRS devices have historically used the integrating sphere technique. Integrating spheres are attractive because they can collect virtually all of the radiation reflected from a surface, independent of direction. They are quite practical in the visible region due to the availability of large area highly sensitive optical detectors and extremely reflective diffuse white coatings for use on the inside of the spheres.

In the mid infrared region ("mid-IR") of the spectrum (fingerprint), integrating spheres have found only occasional use because the reasonably fast mid-IR detectors that are available are relatively small and insensitive and because the diffusely reflective coatings that are available for use in this region do not have the desired reflectance. Instead, most mid-IR DRS sampling systems have used specularly reflecting optical elements such as cassagrains, off-axis paraboloids, or ellipsoids to image the illuminated target directly on a small detector with a minimum number of reflections.

In the near infrared (NIR) region, the history of DRS is quite distinct from both visible and mid-IR DRS. NIR region devices have, in fact, followed a completely different development path. NIR instruments were first developed in the 1970's to inspect grains and other agricultural products. The operation of these early NIR devices was based on switching between relatively small number of fixed frequency optical filters so as to acquire what amounts to a very low resolution spectrum. As a result of the low resolution, the response speed required of the IR detectors was quite modest, allowing large detectors to be used. A typical NIR grain analyzer would thus have a modulated beam of radiation illuminating a small cup of ground up grain. The region above the cup would be occupied by hemispherical array of large area detectors all hooked together so as to collect the maximum possible amount of scattered radiation. This approach is somewhat similar to the methods used to study visible diffuse reflectance except that an array of detectors is used rather than a single detector and an integrating sphere.

Since the development of these early instruments, NIR systems have become more sophisticated, with dispersive spectrometers arriving first, followed by fourier transform infrared ("FTIR") spectrometers being applied in the NIR region of the spectrum.

NIR is used in many fields due to the availability of near-IR transmitting fiber optics for coupling a spectrometer to a remote measurement location. However, sampling optics for use with these newer systems have tended to develop out of the "brute force" tradition started with the earlier NIR region grain analyzers. The most common approach to diffuse reflectance analysis in the NIR region uses a large bundle of fibers that may be one inch (1") in diameter, or more. In some cases, a few of the fibers are used to illuminate the sample with spectrally modulated radiation while the rest of the fibers are used to collect the radiation scattered over a wide range of angles, the collected radiation being conveyed to a single large detector or an array of detectors. Others have conversely illuminated the sample with a large bundle of fibers which obtain their radiation from a large IR source and then used a smaller bundle or even a single fiber to collect a sample of the reflected radiation and route it to the spectral modulator and a small area detector.

The use of a large fiber bundle has a number of drawbacks. Among these are the high cost of large fiber bundles for use at wavelengths much longer than 1 $\mu$m, the limited areas of fast response detectors for use at longer wavelengths, and the fact the throughput of FTIR spectrometers does not allow the use of large bundles. The latter drawback is especially unfortunate because FTIR instruments are becoming increasingly popular for use in the NIR region due to their high frequency stability.

Even when small bundles or single fibers are used for both sample illumination and reception, most workers in the field have continued to use brute force, simply pointing the fibers at the sample. The most successful approach of this type uses a bifurcated fiber bundle 90, without additional optics, as shown in FIG. 1a, 1b, and 1c. As shown, the bifurcated fiber-bundle 90 has a number of individual transmitting and receiving fibers, 91, 92 (eg. 80 fibers) that are randomly distributed within a tip bundle 95 that splits into two smaller leg bundles (eg. 40 fibers each) 93, 94. One leg bundle 93 is used to direct radiation from the source 100 to the target 200 while the other leg bundle 94 is used to direct collected radiation to the detector 110.

FIG. 1c is an enlarged detailed view of the tip bundle 95 of the bifurcated-fiber bundle 90. As shown, the bifurcated bundle 90 will only give good results if the distance between the tip bundle 95 and the target 200 is neither small as compared to the spacing between the transmitting and receiving fibers 91, 92, nor large as compared to the diameter of the overall bundle 90. In particular, the light emerging from an individual transmitting fiber 91 will diverge with a half angle of typically 13 degrees. This is indicated by the solid oblique lines. The field of view of a receiving fiber 92 will likewise have a half angle of typically 13 degrees. If the target 200 is too close (position #1), the fields-of-view of the transmitting and receiving fibers 91, 92 will not overlap, and no signal is received. If the target 200 is too far (position #2), the collection solid angle—determined by the diameter of the bundle 90 and the distance to the target 200—will be too small to collect an adequate amount of the diffusely scattered light.

FIG. 2 shows a probe 9 manufactured by Galileo Electro-optics. In this design, the sample 200 is illuminated by a ring of fibers 2 which are tilted inward to point toward a common central spot 4. The diffusely reflected light is collected by a hollow metallic lightguide 5 which carries it to an infrared area detector 6 at the top of the probe 9. The area of the detector 6 is large enough to approximately match the exit aperture of the lightguide. This Galileo probe 9 has a high collection efficiency, but the detector 6 and its associated electrical connections are inconveniently mounted on the probe 9.

SUMMARY OF INVENTION

The objects of the present invention are to provide a fiber-optic coupled probe or sampling device for use in the spectroscopic analysis of diffusely reflecting substances that:

1. detaches from the fiber-optic bundle so that it can be used at various locations and with various length bundles;
2. mates with economical small diameter fiber-optic bundles;
3. analyzes targets without requiring contact even when such targets are offset from the probe by several millimeters;
4. separates the end of the fiber-optic bundle from the measurement point for analyzing high temperature targets without damaging the bundle;
5. fits into a relatively small diameter opening in a vessel containing a substance to be analyzed;
6. minimizes stray light, i.e. light received in the absence of a target;
7. has a reasonably large depth-of-field so as to reduce the requirement for critical placement of the probe relative to the target;
8. illuminates a reasonably large area to average out variations due to sample grain size or other sources of inhomogeneity;
9. alters the image of the fiber bundle so that the radiation from a given transmitting fiber is not imaged back on the same fiber but instead is spread evenly over a number of transmitting and receiving fibers;
10. operates in a broad spectral region that includes the visible and near infrared regions; and
11. is inexpensive to manufacture.

The present invention generally resides in a diffuse reflectance probe for connection to a fiber bundle having a plurality of transmitting fibers for transmitting radiation from a remote source to illuminate a target and having a plurality of receiving fibers for transmitting radiation that is diffusely reflected from the target to a remote detector for diffuse reflectance analysis.

In a first aspect, the present invention comprises a reflectance probe with a collecting lens for generating collimated radiation by substantially collimating radiation diverging from a transmitting fiber of a fiber bundle and a reflection stop that faces the fiber bundle in a central area of the collecting lens to minimize the amount of the radiation that the collecting lens reflects back to the fiber bundle.

In a second aspect, the present invention comprises a collecting lens for collimating the radiation from a particular transmitting fiber, an objective lens for focusing the collimated radiation onto a focal plane located at a predetermined focal distance from the objective lens, and an elongated lightguide that is located between the collecting lens and the objective lens in order to modify the collimated radiation that originates from an "off-axis" transmitting fiber so that it is imaged onto the target as a first ring and thereby re-imaged onto the fiber bundle as a second ring which is spread over a plurality of receiving fibers for analysis by the remote detector rather than ineffectually reimaged as a point directly back onto the "off-axis" transmitting fiber.

In a third aspect, the present invention comprises a protective housing containing the collecting lens, the objective lens, and the elongated lightguide, a protective window at a far end of the protective housing, a means for varying a distance between the protective window and the objective lens to vary distance between the protective window and the focal plane.

In a fourth aspect, the present invention comprises means for holding the objective lens in a position that is tilted off-axis so that radiation reflected from a rear surface of the objective lens facing the elongated light guide does not reenter the elongated lightguide and reach the fiber bundle as stray light.

BRIEF DESCRIPTION OF THE DRAWINGS

FIG. 2 shows a conventional probe that has an elongated lightguide 5;

FIG. 3 conceptually shows the stray light and image coincidence problems that occurs when using a single lens 20' to image a transmitting fiber 91 onto the target 200 so that the fiber bundle 90 may be kept away from the target 200;

FIG. 4 conceptually shows the stray light, image coincidence, and diverging ray problems that still occur when using a collecting lens 20 and an objective lens 40 to image a transmitting fiber 91, 91' onto the target 200 so that the fiber bundle 90 may be kept even farther away from the target 200;

FIG. 5 shows a preferred lens 20 having a reflection stop 22 that faces the fiber bundle 90 to minimize the amount of the stray light that reflects back to the fiber bundle 90;

FIG. 6 shows a lightguide 60 for use with a focusing lens 20 and an objective lens 40 according to the present invention;

FIGS. 7a and 7b are an end view and a side view, respectively, of the paths of several rays originating from a particular "off-axis" transmitting fiber 91 of FIG. 6 as they travel through the lightguide 60;

FIGS. 8a, 8b, and 8c show the incident and reflected rays inside of the lightguide 60 of FIG. 6 as projected onto the YZ, XZ, and XY planes where the Z axis is normal to the curved surface, the Y axis lies in the surface, and the X axis is tangential to the curved surface;

FIG. 9 conceptually shows a diffuse reflectance probe having a focusing lens 20 with a reflection stop 22, a lightguide 60, and an objective lens 40 tilted off-axis to minimize back reflection;

DETAILED DESCRIPTION OF THE PREFERRED EMBODIMENT

It should be noted at the outset that the term "probe" is used to generally describe a sampling device. It does not require that the sampling device be elongated or be contained in a hand held structure. The inventor uses the term in a more general fashion. A probe according to the present invention could be hand held, flush mounted in a table below passing articles, or in any possible manner suitable for measuring a target.

Figure 12:
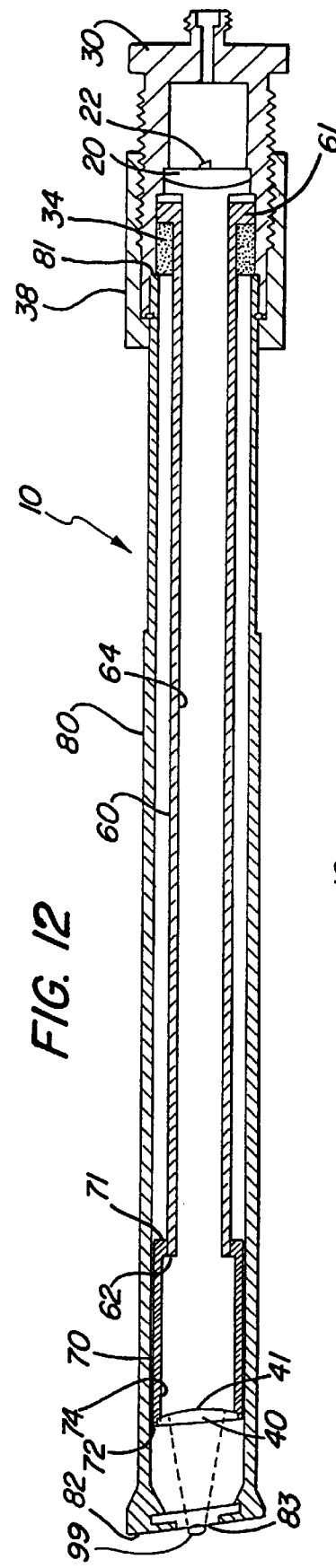
FIG. 12 is a cross-sectional view of the preferred diffuse reflectance probe 10 with the spacer 34 present such that the window 83 is farther away from the objective lens 40, the beam focus 97 is located at the protective window 83, and the probe 10 may be placed in direct contact with the target 200.
Figure 13:
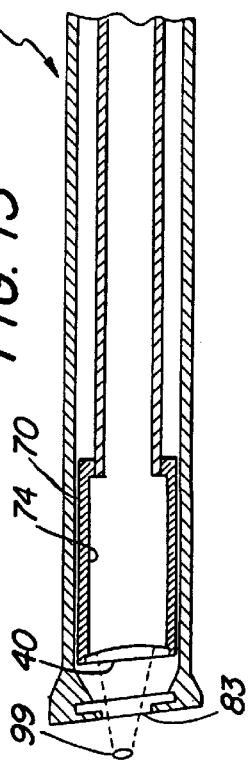
FIG. 13 is a cross-sectional view of the preferred diffuse reflectance probe 10 without the spacer 34 such that the window 83 is nearer to the objective lens 40, the beam focus 97 is located beyond the protective window 83, and the probe 10 may be spaced from the target 200.
Figure 11:
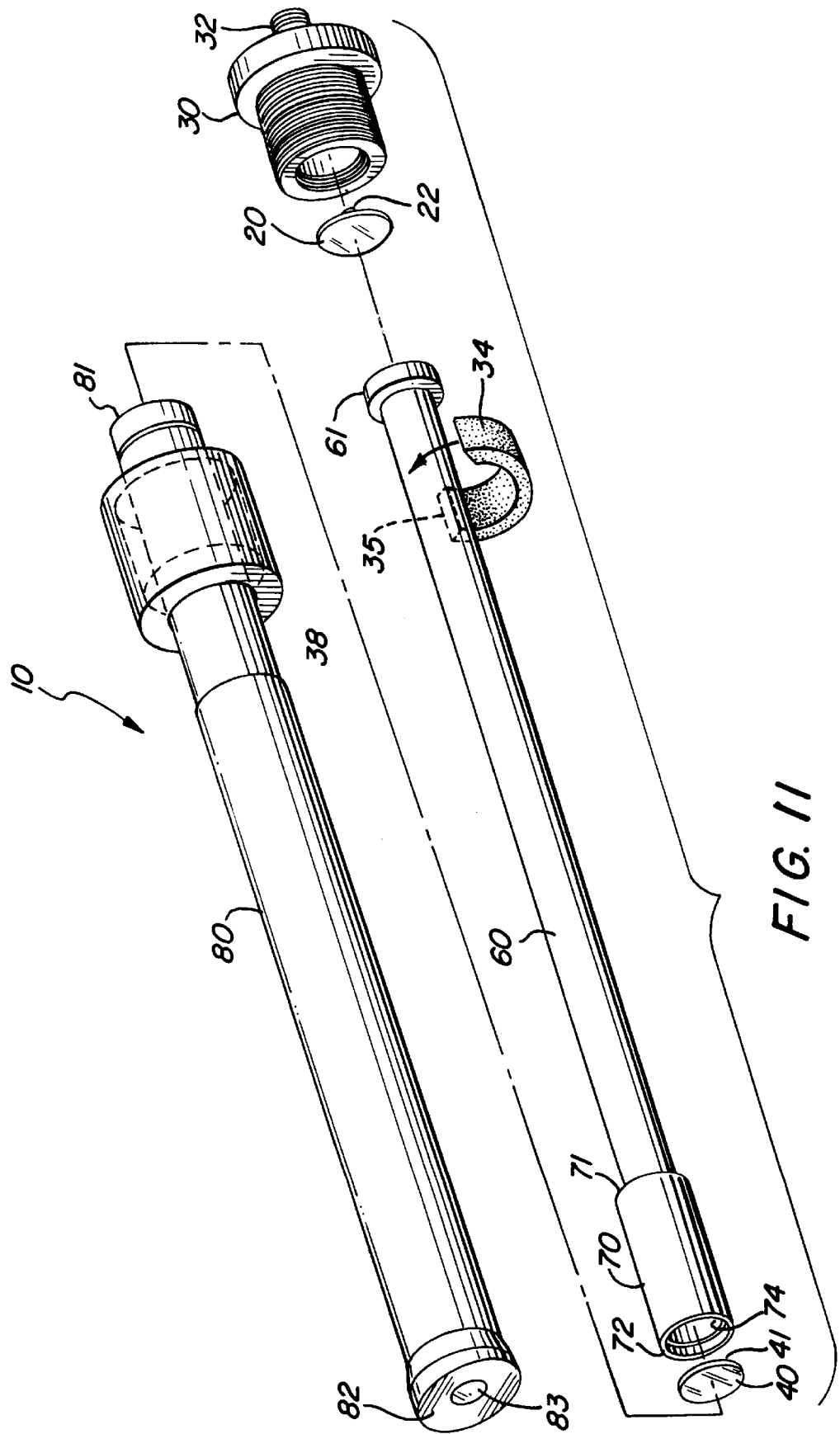
FIG. 11 is an exploded view of the preferred diffuse reflectance probe 10 with a protective housing 80 that contains a lens 20, a lightguide 60, a reflection gap 70, an objective lens 40 behind a protective window 83, and an optional spacer 34 for selectively moving the protective window 83 relative to the objective lens 40.

FIGS. 11, 12 and 13 show a preferred diffuse reflectance probe 10 according to the present invention. The preferred probe 10 is best understood, however, by first reviewing the inventor's methodology of arriving at the preferred embodiment with reference to the figures.

The inventor initially recognized that a bifurcated fiber bundle 90 could be combined with at least one lens to achieve several of the desired objects including, most notably, analyzing samples without requiring contact and separating the end of the fiber bundle from a high temperature target. The use of a lens, however, creates problems which must be overcome if the probe is to be operable.

FIG. 3, for example, shows a first conceptual system wherein a single lens 20' is used to image the bundle 90 on a sample or target 200. The design of FIG. 3 effectively separates the fiber bundle 90 from the target 200, and achieves several other objectives of the present invention, but two notable defects are still apparent:

Stray Light: First, a portion 96 of the light striking the central area of the lens 20' will be reflected back on the fiber bundle as stray light 21. This problem can be reduced by antireflection coating the lens 20', but the reflected light 21 would still be significant as compared to the diffusely reflected signal due to the limited efficiency of the diffuse collection process.

Image Coincidence: Second, when the system is properly focused, the light from a given fiber 91 will be imaged onto the sample 200 as a small spot 99. In the absence of aberrations or diffusion (spreading) of the image at the sample 200, light reflected from the spot 99 will be collected by the lens 20' and reimaged back in the plane of the bundle 90 so as to be centered on the same fiber 91 that it originated from. Accordingly, all of the light from the transmitting fiber 91 may return to the original transmitting fiber 91 without ever reaching a receiving fiber 93. Of course, there usually will be some diffusion. However, the diffusion distance will depend on sample characteristics such as refractive index, absorptivity, and grain size. This dependence could give rise to significant and undesirable spectral artifacts.

The reimaging problem could be partly alleviated by defocusing the optical system. It would be possible to defocus the system enough to achieve overlap with some of the receiving fibers 93 with only a modest reduction in signal level as long as the diameter of the fiber bundle 90 is large compared to the diameter of the individual fibers 91, 93. Defocusing is not desired, however, because it would reduce the depth of field by more than a factor of two. In addition, the spectral characteristics are likely to vary with the amount of defocusing and hence with target position.

FIG. 4 conceptually shows a second system wherein a "nominally" collimated region 45 is located between two lenses 20, 40 so that the length of the probe may be extended, the fiber-bundle 90 may be kept further away from a high temperature target 200, or both. This two-lens design, however, still has the stray light problem and image coincidence defects of the single lens design. It even adds two more refractive surfaces that will cause more stray light. Moreover, an inherent beam divergence occurs within the nominally collimated region 45 of the two lens design due to the finite diameter of the fiber bundle 90. This divergence, or growth, places a practical limit on the length to diameter ratio for a given focal length of the collecting lens 20.

The present invention solves the two major problems of stray light and image coincidence, overcomes the length to diameter limitation, and achieves the other objectives as follows.

Returning to FIG. 3, consider the stray light 21 which results from reflection at the first lens surface of lens 20'. As already noted, an antireflection coating is not likely to reduce the reflected light level enough to meet our requirements. It can be seen, however, that only those rays which strike the lens within an area having the same diameter as the bundle 90 are reflected back within the diameter of the fiber bundle 90. Thus, we simply have to eliminate these rays. Two possible solutions are black paint or a rough ground surface within the central area, but they would probably exhibit at least as much residual reflection as the antireflection coating.

FIG. 5 shows a preferred solution to the stray light problem caused by reflections from a first lens 20. As shown, a central reflecting region of a first lens 20 is covered by a reflection a stop 22 which directs any reflected light away from the bundle 90. The preferred reflections stop 22 is a cylinder 22 with a front surface 24 that that is polished and angled from the system axis. The reflection stop 22 preferably comprises glass and has a diameter that is equal to or slightly greater than that of the fiber bundle 90 so that any ray which misses the reflection stop 22 and strikes the first surface of the lens 20 will still be reflected at an angle which causes it to miss the fiber bundle 90. Such a ray is label "1r" on the figure. Other rays such as "2r" and 2tr" which strike front surface 24 of the glass cylinder 22 also do not reach the bundle 90.

Returning to FIG. 4, it was noted above that the second lens 40 will also be a source of stray light. Such stray light could also be eliminated by selectively blocking the offending areas of the lens 40. As compared with the collecting lens 20, however, a larger area of the lens 40 would have to be blocked. In accordance with this invention, therefore, the objective lens 40 is instead tilted at a sufficient angle to make sure that most or all of the light reflected from both surfaces of the lens 40 falls outside of the field of view of the bundle 90. This tilting approach is discussed further below with reference to FIGS. 9 and 10.

The system of FIG. 4 allows the bundle 90 to be spaced even farther from the target 200 but, as discussed above, but it still has the problem of reimaging of the transmitting fibers 91 onto themselves and the added problem of growth in beam diameter within the nominally collimated area 45. Both of these problems, however, are solved by an innovative lightguide 60 according to the present invention.

The preferred lightguide is a hollow metal tube having a diameter and length 60 such that most of the radiation from a typical off-axis fiber 91 will be reflected at least once by the wall of lightguide 60. The lightguide could also be made of a solid refractive material such as fused silica, but reflections from the ends of the solid lightguide, however, would constitute additional components of the stray light. Antireflection coatings could be applied to these surfaces (as well as to the other refractive surfaces). But, the residual stray light would probably be significant when compared to the amount of light collected from the diffusely reflecting surface.

The lightguide 60 resolves the problem of diverging rays within the nominally collimated area 45 by containing such rays within the lightguide 60. As a result, the diverging rays are no longer a constraint on the geometry of the probe 10 and it can be made longer, and narrower, if desired.

The lightguide 60 resolves the reimaging problem as follows. Without the lightguide 60 (as shown in FIG. 4), all of the rays coming from the center of a particular fiber (e.g. 91, 91') will be parallel after passing through the collecting lens 20 and will be focused on the same point (e.g. 99, 99') on the target 200 by the objective lens 40. As discussed above, the scattered light will be collected by the objective lens 40 and may be reimaged back on the transmitting fiber 91, 91'.

With the lightguide 60 (as shown in FIG. 6), the characteristics of the transmitted light will be modified in a unique way that solves the reimaging problem. After the rays from a particular transmitting fiber 91 are reflected from the wall of the lightguide 60, the rays will no longer be parallel. (i.e. only those that fall in the same axial plane will be parallel.) Each ray, however, will still make the same angle with a local line parallel to the system axis. This is hard to visualize and difficult to illustrate in a flat figure, but the validity of this statement can be shown by the following discussion with reference to FIG. 7 which illustrates the paths of several rays 96, 96', 96" originating from a given transmitting fiber 91 that is displaced from the system axis.

First consider FIG. 7a which shows the paths of three rays 96, 96', 96" in the nominally collimated region 45 projected onto a plane that is perpendicular to the system axis. In this plane, the projection of the lightguide 60 is a circle and the projections of the initial rays are parallel 96, 96', 96". However, after reflection, the ray projections 97, 97', 97" are seen to be traveling in different directions. FIG. 7b shows the same three rays 96, 96', 96" projected onto a plane parallel to the system axis. If only this projection is considered, the three rays 96, 96', 96" appear to make different angles with the axis. But this is deceptive. We know that the cylindrical wall of the lightguide 60 is parallel to the system axis at all points. We also know that all of the rays originating from a given point in the fiber bundle 90 will be parallel to each other in the nominally collimated region 45 had they not encountered the wall of the lighguide 60. Therefore they all make the same angle with an intersecting ray parallel to the system axis.

We can further confirm that the rays from a particular point or transmitting fiber 91 in the fiber bundle 90 continue to make the same angle with an intersecting ray as follows. One of the rules of optics is that the angle of reflection is equal to the angle of incidence. Normally in analyzing optical reflection, we work in the plane of incidence, i.e. the plane containing both the ray in question and the normal to the surface. But this is not necessary. The rule applies no matter what coordinate system we decide to use. For example, consider an individual ray and select a coordinate system with its origin at the point where the ray strikes the wall of the lightguide 60. Now assume the coordinate system axes defined in FIG. 8a. The Z axis is the normal to the surface, the Y axis lies in the surface and is parallel to the system axis, and the X axis is tangential to the curved surface.

FIGS. 8a, 8b, and 8c show an incident ray 96 and reflected ray 97 projected into the YZ, XZ, and XY planes. In the first two figures, the projections of the incident and reflected rays make equal angles with the wall and hence with the X, Y and Z axes. Now consider the projection shown in FIG. 8c. The XY plane is tangential to the wall and hence the wall has no projection in this plane. As a result, the ray projections 96, 97 are in a straight line and make a constant angle with the Y axis. But we've defined the Y axis to be parallel to the system axis. Thus, we can state that since the projection of rays 96, 97 make fixed angles with the Y axis in each of three perpendicular planes, the reflected ray 97 itself makes a fixed angle with the system axis. Since we could carry out this exercise for the rays emanating from a given fiber which pass through any desired collection of points in the plane of the collimating lens 20 (choosing the appropriate coordinate system for each one), we can state that all of these rays make the same angle with the system axis.

Now, consider what happens when the various rays discussed above are focused on the target 200. Each ray will strike the target 200 at the same distance from the center since this distance is determined by the angle with respect to the axis. However, they will have different azimuthal positions. The net image from a transmitting fiber 91 will be a first ring 204. Furthermore, when the scattered radiation from the first 204 ring is imaged back at the fiber bundle 90, each point 205 on the first ring 204 will be reimaged onto the bundle 90 as a ring that overlaps even more rings that were reimaged from other points in the first ring 205 to collectively form a second ring 205. The net result is the that image originating from a single transmitting fiber 91 is now spread around a second ring 205 that overlaps just as many receiving fibers 93 as transmitting fibers 91. When we consider all of the transmitting fibers 91 we find that we have effectively randomized the positions of the received rays without increasing the diameter of the overall image as required by defocusing, i.e. the image of the whole fiber bundle 90 is still effectively in focus.

Figure 1:
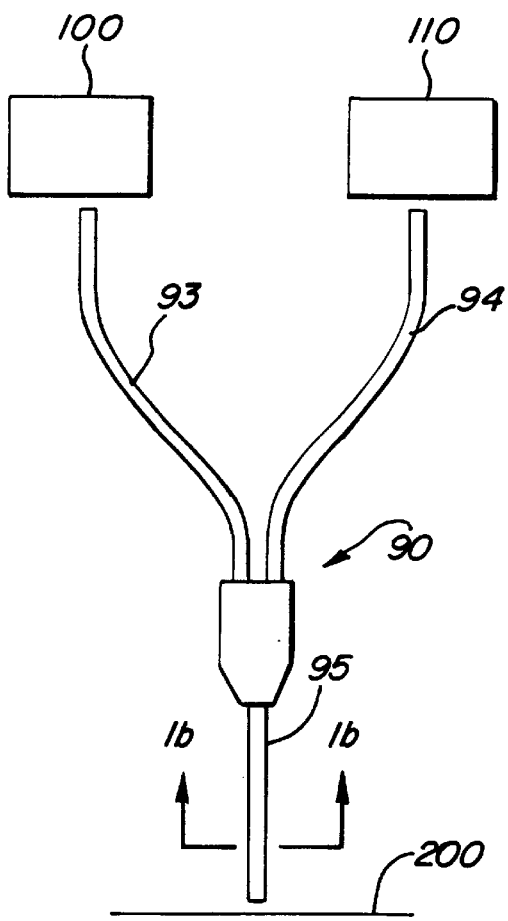
FIG. 1a shows a conventional bifurcated fiber-bundle 90 having a tip bundle 95 that splits into separate leg bundles 93, 94.
FIG. 1b is a cross sectional view of FIG. 1a, taken along section lines 1b—1b, showing the random distribution of the transmitting and collecting fibers 91, 92 within the tip bundle 95.
FIG. 1c shows the limitations of using a bifurcated fiber-bundle 90 in the conventional "brute force" fashion wherein the tip bundle 95 must be placed so undesirably close to the target 200 that it may be damaged by heat and wherein the tip bundle 95 may be easily positioned too close (position #1) or too far (position #2) even where heat is not an issue.
Figure 1C:
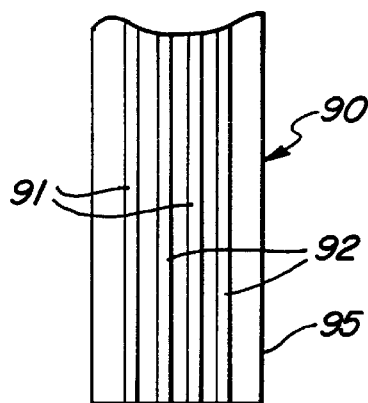
Figure 1B:
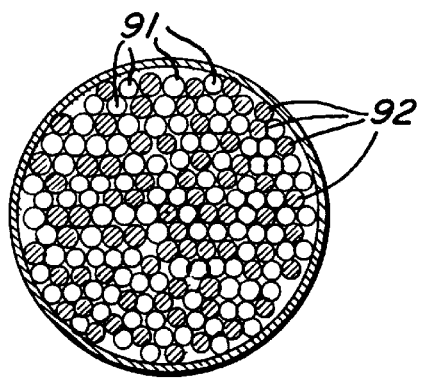
Figure 10:
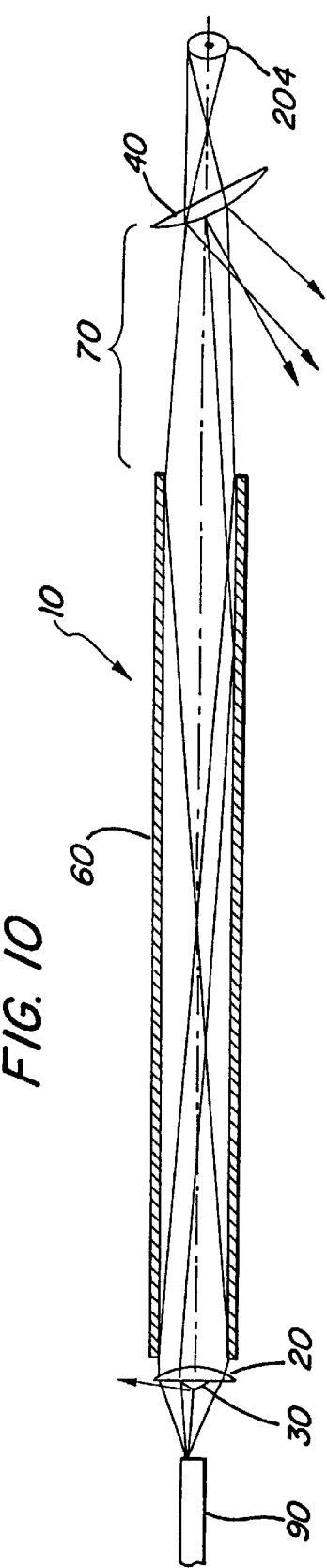
FIG. 10 conceptually shows a preferred diffuse reflectance probe 10 that has a reflection gap 70 in addition to those elements shown in FIG. 9.

FIG. 9 shows an embodiment of my invention which combines the use of the lightguide 60 with a reflection stop 22 on the collimating lens 20 and a tilt of objectives lens 40 to minimize stray light. Experimentally, however, we have found one limitation with this design. If the lightguide 60 extends the full distance between the two lenses 20, 40, radiation reflected from the surfaces of the objective 40 lens will fall within the lightguide 60. Some of this can reach the receiving fibers 93 and contribute to stray light. The solution is to include a reflection gap 70 between the end of the lightguide 60 and the objective 40. This is shown in FIG. 10.

FIGS. 11, 12, and 13 illustrate a preferred diffuse reflectance probe 10 according to the present invention. As best shown in the exploded view of FIG. 11, the preferred probe 10 includes an elongated housing 80, an end cap 30, and an end sleeve 38. The end cap 30 has a standard SMA connector 32 for detachable connection to a fiber bundle 90 (not shown).

The end cap 30 and end sleeve 38 thread together to secure one another at a near end 81 of the elongated housing 80. The lightguide 60 has a shoulder 61 that abuts the end cap 30 and is trapped by the end sleeve 38. The following elements are thereby secured between the end cap 30 and a protective window 83 (e.g. sapphire) at a far end 82 of the elongated housing 80: the collecting lens 20, the lightguide 60, the reflection gap 70, and the objective lens 40.

The reflection gap 70 is preferably press fit onto the lightguide 60 at a near end 71 thereof. Moreover, it has a groove 74 at a far end 72 thereof for retaining the objective lens 40 at a tilt, as described above. The interior of the reflection gap is preferably made antireflective by coating it, or by mechanically altering its surface, to prevent secondary reflections from entering the lightguide 60.

A notable component of the probe 10 is the optional spacer 34. The preferred spacer 34 has a slot 35 so that it can be slid on or off of the lightguide 60. The spacer 34, when present, is trapped between the shoulder 61 on the lightguide 60 and the near end 81 of the elongated housing 80. As a result, the spacer 34 will prevent the elongated housing 80 from contacting the shoulder 61. Accordingly, the spacer 34 may be used to vary the position of the elongated housing's window 83 relative to the objective lens 40. If the spacer is present, as shown in FIG. 12, the window 83 is farther away from the objective lens 40, the beam focus 97 is located at the protective window 83, and the probe 10 may be placed in direct contact with the target 200. If the spacer 34 is not used, as shown in FIG. 13, the window 83 is closer to the objective lens 40, the beam focus 97 is located beyond the protective window 83, and the probe 10 may be spaced from the target 200.

I claim:

1. A diffuse reflectance probe for connection to a fiber bundle having a plurality of transmitting fibers for transmitting radiation from a remote source to illuminate a target and having a plurality of receiving fibers for transmitting radiation that diffusely reflected from the target to a remote detector for diffuse reflectance analysis, the reflectance probe comprising:

a collecting lens for collecting radiation diverging from a transmitting fiber of a fiber bundle; and a reflection stop that faces the fiber bundle and partially covers the collecting lens at a central area thereof to minimize the amount of the radiation that the collecting lens reflects back to the fiber bundle.

2. The diffuse reflectance probe of claim 1 wherein the reflection stop has a diameter that is at least as large as a diameter of the fiber bundle.

3. The diffuse reflectance probe of claim 2 wherein the reflection stop comprises a truncated cylinder with a slanted face.

4. The diffuse reflectance probe of claim 3 wherein the slanted face is reflective.

5. The diffuse reflectance probe of claim 1 wherein the reflection stop comprises a cone.

6. The diffuse reflectance probe of claim 5 wherein the cone is reflective.

7. The diffuse reflectance probe of claim 6 wherein the reflective cone comprises glass.

8. The diffuse reflectance probe of claim 1 wherein the reflection stop comprises a substantially nonreflective coating.

9. The diffuse reflectance probe of claim 8 wherein the substantially nonreflective coating is black paint.

10. The diffuse reflectance probe of claim 1 wherein the reflection stop comprises a rough ground surface.

11. A diffuse reflectance probe for connection to a fiber bundle having a plurality of transmitting fibers for transmitting radiation from a remote source to illuminate a target and having a plurality of receiving fibers for transmitting radiation that is diffusely reflected from the target to a remote detector for diffuse reflectance analysis, the reflectance probe comprising:

a collecting lens for collimating radiation diverging from a transmitting fiber of a fiber bundle to generate collimated radiation;

an objective lens for focusing the collimated radiation onto a focal plane located at a predetermined focal distance from the objective lens; and an elongated lightguide that is located between the collecting lens and the objective lens, the elongated lightguide modifying the collimated radiation that originates from an "off-axis" transmitting fiber that is radially displaced from a system axis of the probe such that the collimated radiation from the off-axis transmitting fiber is imaged onto the target as a first ring and thereby re-imaged onto the fiber bundle as a second ring which is spread over a plurality of receiving fibers for analysis by the remote detector rather than ineffectually reimaged as a point directly back onto the "off-axis" transmitting fiber.

12. The diffuse reflectance probe of claim 11 wherein the elongated lightguide comprise a hollow cylinder having a reflective inner surface.

13. The diffuse reflectance probe of claim 11 wherein the elongated lightguide comprises a solid dielectric material.

14. The diffuse reflectance probe of claim 11 wherein the objective lens is tilted off-axis so that radiation reflected from a rear surface of the objective lens 40 facing the elongated light guide does not reenter the elongated lightguide and reach the fiber bundle as stray light.

15. The diffuse reflectance probe of claim 14 further comprising a reflection gap between the objective lens and the elongated lightguide so that radiation reflected from the rear surface of the objective lens is directed into the reflection gap and does not reenter the elongated lightguide and reach the fiber bundle as stray light.

16. The diffuse reflectance probe of claim 15 wherein the reflection gap comprises a hollow cylindrical body having a near end and a far end, the near end connected to the elongated light guide and the far end holding the objective lens.

17. The diffuse reflectance probe of claim 14 wherein the hollow cylindrical body has a roughened interior to help absorb the radiation reflected from the rear surface of the objective lens so that the reflected radiation does not reenter the elongated lightguide and reach the fiber bundle as stray light.

18. The diffuse reflectance probe of claim 11 further comprising a reflection stop that faces the fiber bundle in a central area of the collecting lens to minimize the amount of the radiation that the collecting lens reflects back to the fiber bundle.

19. The diffuse reflectance probe of claim 18 wherein the reflection stop has a diameter that is at least as large as a diameter of the fiber bundle.

20. The diffuse reflectance probe of claim 19 wherein the reflection stop comprises a truncated cylinder with a slanted face.

21. The diffuse reflectance probe of claim 19 wherein the slanted face is reflective.

22. The diffuse reflectance probe of claim 18 wherein the reflection stop comprises a cone.

23. The diffuse reflectance probe of claim 22 wherein the cone is reflective.

24. The diffuse reflectance probe of claim 23 wherein the reflective cone comprises glass.

25. The diffuse reflectance probe of claim 18 wherein the reflection stop comprises a substantially nonreflective coating.

26. The diffuse reflectance probe of claim 25 wherein the substantially nonreflective coating is black paint.

27. The diffuse reflectance probe of claim 18 wherein the reflection stop comprises a rough ground surface.

28. A diffuse reflectance probe for connection to a fiber bundle having a plurality of transmitting fibers for transmitting radiation from a remote source to illuminate a target and having a plurality of receiving fibers for transmitting radiation that is diffusely reflected from the target to a remote detector for diffuse reflectance analysis, the reflectance probe comprising:

a collecting lens for collimating radiation diverging from a transmitting fiber of a fiber bundle to generate collimated radiation;

a reflection stop that is located in a central area of the collecting lens that faces the fiber bundle to minimize the amount of the radiation that the collection lens reflects back to the fiber bundle;

an objective lens for focusing the collimated radiation onto a focal plane located at a predetermined focal distance from the objective lens;

an elongated lightguide that is located between the collecting lens and the objective lens, the elongated lightguide modifying the collimated radiation that originates from an "off-axis" transmitting fiber that is radially displaced from a system axis of the probe such that the collimated radiation from the off-axis transmitting fiber is imaged onto the target as a first ring and thereby re-imaged onto the fiber bundle as a second ring which is spread over a plurality of receiving fibers for analysis by the remote detector rather than ineffectually reimaged as a point directly back onto the "off-axis" transmitting fiber;

a protective housing containing the collecting lens, the objective lens, and the elongated lightguide;

a protective window at a far end of the protective housing; and means for varying a distance between the protective window and the objective lens to vary a distance between the protective window and the focal plane.

29. The diffuse reflectance probe of claim 28 wherein the elongated lightguide comprise a hollow cylinder having a reflective inner surface.

30. The diffuse reflectance probe of claim 28 wherein the elongated lightguide comprises a solid dielectric material.

31. The diffuse reflectance probe of claim 28 wherein the distance varying means comprises a detachable spacer located between an annular shoulder of the elongated lightguide and an abutting end of the protective housing.

32. The diffuse reflectance probe of claim 31 wherein the detachable spacer comprises a split ring.

33. A diffuse reflectance probe for connection to a fiber bundle having a plurality of transmitting fibers for transmitting radiation from a remote source to illuminate a target and having a plurality of receiving fibers for transmitting radiation that is diffusely reflected from the target to a remote detector for diffuse reflectance analysis, the reflectance probe comprising:

a collecting lens for collimating radiation diverging from a transmitting fiber of a fiber bundle to generate collimated radiation;

an objective lens for focusing the collimated radiation onto a focal plane located at a predetermined focal distance from the objective lens;

an elongated lightguide that is located between the collecting lens and the objective lens, the elongated lightguide modifying the collimated radiation that originates from an "off-axis" transmitting fiber that is radially displaced from a system axis of the probe such that the collimated radiation from the off-axis transmitting fiber is imaged onto the target as a first ring and thereby re-imaged onto the fiber bundle as a second ring which is spread over a plurality of receiving fibers for analysis by the remote detector rather than ineffectually reimaged as a point directly back onto the "off-axis" transmitting fiber; and means for holding the objective lens in a position that is tilted off-axis so that radiation reflected from a rear surface of the objective lens 40 facing the elongated light guide does not reenter the elongated lightguide and reach the fiber bundle as stray light.

34. The diffuse reflectance probe of claim 33 further comprising a reflection gap between the objective lens and the elongated lightguide so that radiation reflected from the rear surface of the objective lens is directed into the reflection gap and does not reenter the elongated lightguide and reach the fiber bundle as stray light.

35. The diffuse reflectance probe of claim 34 wherein the reflection gap comprises a hollow cylindrical body having a near end and a far end, the near end connected to the elongated light guide and the far end holding the objective lens.

36. The diffuse reflectance probe of claim 35 wherein the hollow cylindrical body has a roughened interior to help absorb the radiation reflected from the rear surface of the objective lens so that the reflected radiation does not reenter the elongated lightguide and reach the fiber bundle as stray light.

* * * * *